United States Patent
Erickson et al.

(10) Patent No.: US 7,913,047 B2
(45) Date of Patent: Mar. 22, 2011

(54) METHOD AND SYSTEM FOR OPTIMIZING DATA BACKUP

(75) Inventors: Scott Erickson, Sierra Madre, CA (US); Jeffrey M. Jordan, Valley Village, CA (US); William Rothe, Fullerton, CA (US)

(73) Assignee: Disney Enterprises, Inc., Burbank, CA (US)

(*) Notice: Subject to any disclaimer, the term of this patent is extended or adjusted under 35 U.S.C. 154(b) by 450 days.

(21) Appl. No.: 12/221,306

(22) Filed: Aug. 1, 2008

(65) Prior Publication Data
US 2010/0030984 A1 Feb. 4, 2010

(51) Int. Cl.
*G06F 12/00* (2006.01)
(52) U.S. Cl. ................ 711/162; 711/E12.113
(58) Field of Classification Search .......... 711/162, 711/161, 165, E12.113
See application file for complete search history.

(56) References Cited

U.S. PATENT DOCUMENTS

2005/0262168 A1* 11/2005 Helliker et al. ............. 707/204
2006/0200623 A1* 9/2006 Gonzalez et al. ............ 711/111

OTHER PUBLICATIONS

Chervenak et al., "Protecting file systems: A survey of backup techniques," Proceedings Joint NASA and IEEE Mass Storage Conference, 15 pages, Mar. 1998.*

* cited by examiner

*Primary Examiner* — Pierre-Michel Bataille
(74) *Attorney, Agent, or Firm* — Farjami & Farjami LLP

(57) ABSTRACT

There is provided a method for optimizing a data backup. The method comprising determining a backup project size, the backup project size identifying the quantity of data to be backed up; detecting available recording devices for transferring the data backup to storage media; receiving an input corresponding to at least one user specified optimization variable, wherein the at least one user specified optimization variable comprises an upper limit on the length of each of the calculated plurality of data streams; utilizing the at least one user specified optimization variable to calculate a plurality of data streams for performing the data backup; and assigning subsets of the plurality of data streams to the available recording devices to optimize the data backup.

19 Claims, 4 Drawing Sheets

METHOD AND SYSTEM FOR OPTIMIZING DATA BACKUP

BACKGROUND OF THE INVENTION

1. Field of the Invention

The present invention relates generally to data management. More particularly, the present invention relates to data storage.

2. Background Art

The capacity to recover or restore data after a data loss event is a crucial aspect of data management. Data restoration capacity is typically related to the frequency and efficiency with which data is backed up. The frequency of data backups may be particularly important where data is often added to, removed from, or otherwise modified within a database, for example. Under those circumstances, the frequency with which data backups are performed may determine the extent to which a state may be fully restored after a disaster loss event. Thus, failure to perform regular data backups spaced by appropriate time intervals may result in substantial or even catastrophic irretrievable losses in the wake of a natural disaster or system failure.

Backup efficiency may take at least two forms relating to the time required to perform a data backup, or timing efficiency, and the manner in which data files are distributed over storage media, or storage efficiency. Timing efficiency, particularly where large amounts of data are routinely backed up, may become a limiting factor in determining the frequency with which data backups can by performed. As a result, timing inefficiency in the data backup process may compromise data restoration capacity.

Even where data backups are performed routinely and in a timely manner, however, the storage efficiency of those backups may influence the effectiveness with which data can be restored after a data loss event. For example, where data storage is efficient, so that backup data blocks are logically distributed across relatively few units of storage media, those data blocks may be readily accessed and recovered during data restoration. Where data storage is less efficient, however, and backup data blocks are widely distributed across numerous units of storage media, data restoration may be a time consuming and painstaking process, despite an otherwise adequate data backup procedure being in place. Consequently, inadequacies in either or both the timing efficiency and the storage efficiency of the data backup process may render their effectiveness in enabling data restoration less than optimal.

FIG. 1 shows a diagram of a conventional system for performing data backup in a typical storage area network (SAN) environment. Data management system 100, in FIG. 1, includes servers 112a, 112b, and 112c, SAN 110, and computer controlled tape library 130. SAN 10 may be utilized to mediate transfer of data, such as data folders 114, 116, 118, and 120, from servers 112a, 112b, and 112c, where the data is produced and/or modified, to computer controlled tape library 130, where the data can be backed up. Computer controlled tape library 130 is shown to include tape drives 134a, 134b, 134c, and 134d for performing data backup under the control of backup software 132. Computer controlled tape library 130 is also shown to include processor 138 controlling the operation of computer controlled tape library 130 and execution of backup software 132.

The conventional system of FIG. 1 is configured to perform data backup in what is typically referred to as a single stream mode. As may be seen from FIG. 1, each of data folders 114, 116, 118, and 120 is locked to a single tape drive and delivered to that recording device as respective single data streams 124, 126, 128, and 130. A substantial disadvantage of the conventional system of FIG. 1 is that the timing efficiency of the data backup process may be very poor. In the example shown in FIG. 1, for instance, there is considerable disparity in the sizes of the data folders. While data folders 114 and 118 are quite large, holding respectively three terabytes and four terabytes of data, data folders 116 and 120 are much smaller, holding respectively two hundred gigabytes and four hundred gigabytes of data. Such a distribution of data folder sizes may not be uncommon in computing environments used to produce television or animation content, for example.

Unfortunately, from the standpoint of timing efficiency, the single stream mode data backup performed by data management system 100 does not adequately account for those data folder size disparities. Tape drive 134b, dedicated to smallest data folder 116, may operate for a relatively short of period of time, for example, two hours, while tape drive 134c, dedicated to largest data folder 118, may operate for a vastly longer period, for example, approximately forty hours. As a result, the backup process, tied as it is to the time taken to backup largest data folder 118 may require forty hours to complete, during which tape drive 134c is fully utilized for the entire period. By contrast, tape drive 134a may operate for approximately seventy-five percent of the total backup period, while the data storage resources represented by tape drives 134b and 134d are much less fully utilized, resulting in a high degree of timing inefficiency.

FIG. 2 shows a diagram of another conventional system for performing data backup in a SAN environment. Data management system 200, in FIG. 2, is structurally very similar to data management system 100 in FIG. 1, and includes servers 212a, 212b, and 212c, SAN 210, and computer controlled tape library 230. Analogously to the situation in FIG. 1, in FIG. 2, SAN 210 may be utilized to mediate transfer of data folders 214 and 216 from servers 212a, 212b, and 212c, where they are produced and/or modified, to computer controlled tape library 230 for data backup. As in FIG. 1, computer controlled tape library 230, in FIG. 2, includes tape drives 234a, 234b, 234c, and 234d under the control of backup software 232. Computer controlled tape library 230 is also shown to include processor 238 controlling the operation of computer controlled tape library 230 and execution of backup software 232.

As may become apparent from comparison of FIGS. 1 and 2, the conventional system of FIG. 2 is configured to perform data backup in a multi-stream mode. Rather than locking individual data folders to individual tape drives, as in the single stream mode of FIG. 1, data folders 214 and 216 are algorithmically broken down into data blocks that are dispersed across tape drives 234a, 234b, 234c, and 234d in the multi-stream mode of FIG. 2. This may be done in an attempt to improve the timing efficiency of the backup process by utilizing all available tape drives more fully than is done in single stream mode. Backup software 232 typically breaks down the data from data folders 214 and 216 according to a predetermined algorithm coded into the software. As a result, the data contained in data folder 214 is broken down into multi-streams 224a, 224b, 224c, and 224d, delivered respectively to tape drives 234a, 234b, 234c, and 234d. Similarly, the contents of data folder 216 are delivered to tape drives 234a, 234b, 234c, and 234d, as respective multi-streams 226a, 226b, 226c, and 226d.

A substantial disadvantage of the conventional system of FIG. 2 is that while timing efficiency may be improved, any improvement comes at the price of reduced storage efficiency, which may become very poor for system 200. For example, a common outcome of the approach shown in FIG. 2 is that data folders 214 and 216 are highly fragmented and dispersed over many units of data storage media during backup, e.g., in this case many storage tapes. In addition, it is frequently the case that individual tapes may be greatly underutilized, so that a storage tape having a capacity of four hundred gigabytes, for example, may have less than one gigabyte of relevant data stored on it. Consequently, because of the large number of units of storage media generated, and the dispersion of data fragments over that media, the approach shown by FIG. 2 may, while leading to faster backups, result in a challenging and time consuming data restoration process.

Accordingly, there is a need to overcome the drawbacks and deficiencies in the art by providing a solution that optimizes data backup by appropriately balancing timing efficiency and storage efficiency to facilitate data restoration in the aftermath of a loss event.

SUMMARY OF THE INVENTION

There are provided methods and systems for optimizing data backup, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
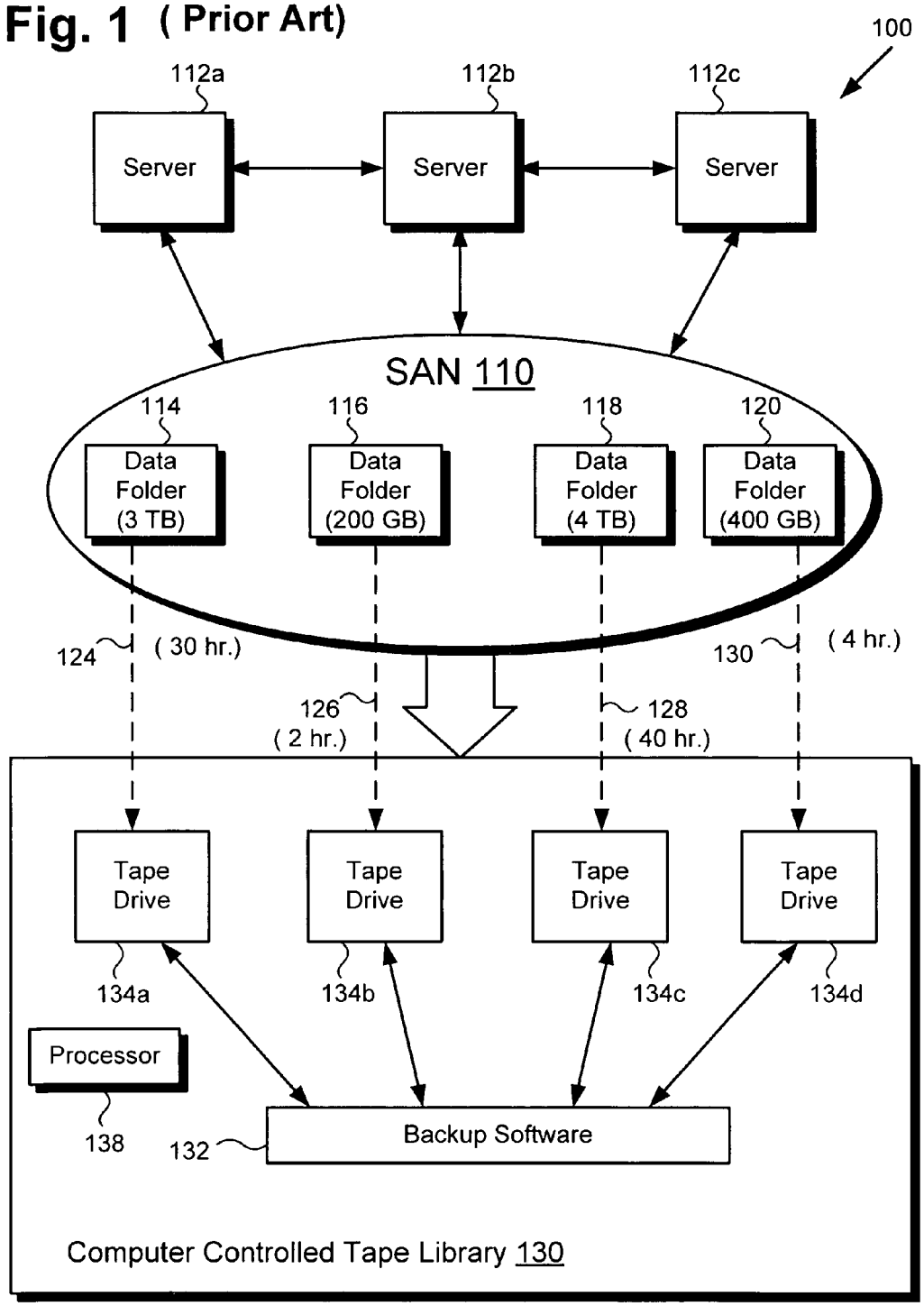
FIG. 1 shows a diagram of a conventional system for performing data backup in a storage area network (SAN) environment.

The present application is directed to a method and system for optimizing data backup. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Figure 3:
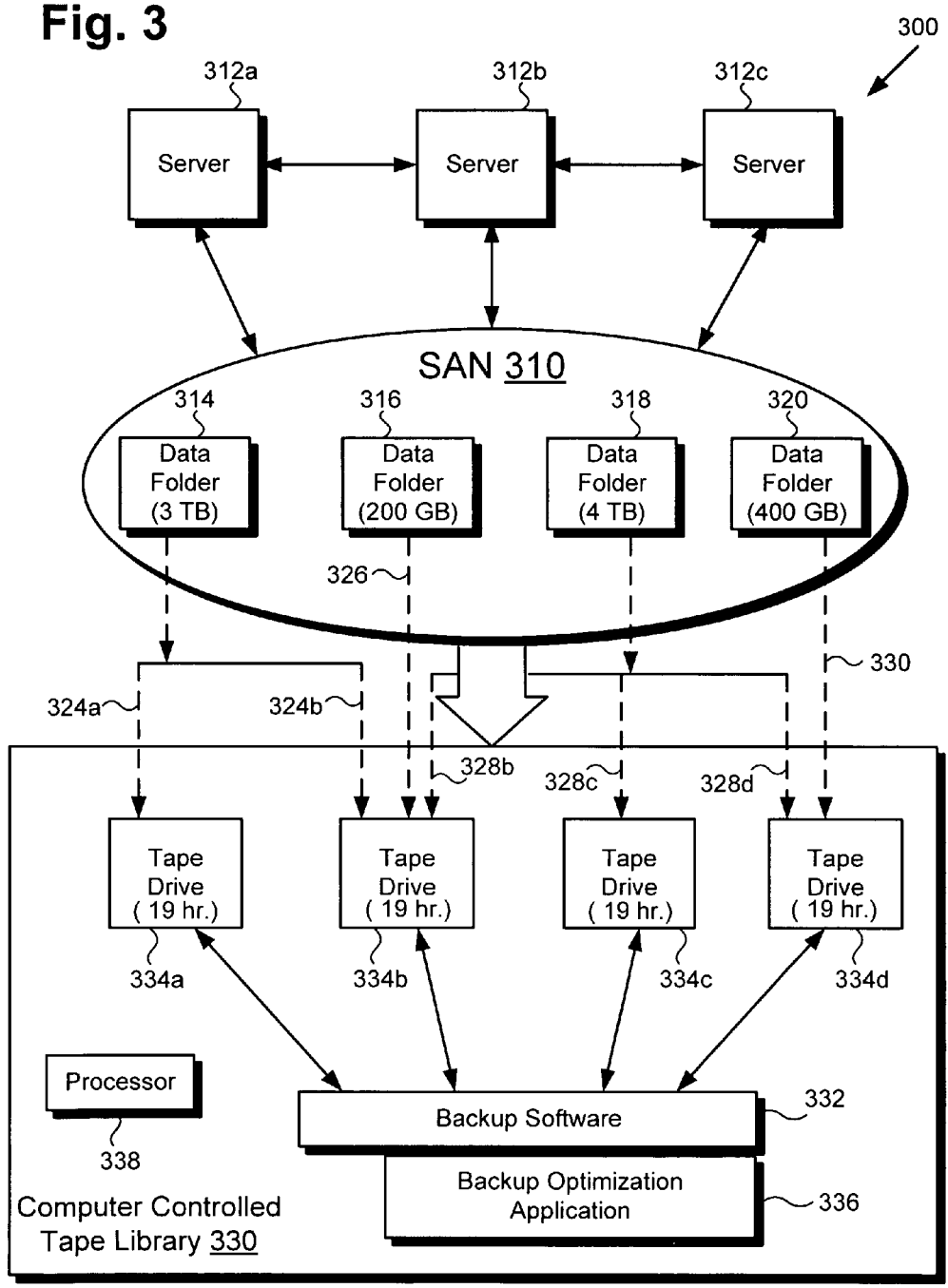
FIG. 3 shows a diagram of a system for optimizing data backup, according to one embodiment of the present invention.

FIG. 3 shows a block diagram of an exemplary system for optimizing data backup, according to one embodiment of the present invention. In the embodiment of FIG. 3, system 300 comprises storage area network (SAN) 310 interactively connected to servers 312a, 312b, and 312c, and computer controlled tape library 330. SAN 310 is configured to use computer controlled tape library 330 to back up data, such as data produced and/or modified on servers 312a, 312b, and 312c, for example. That data is represented in FIG. 3 by data folders 314, 316, 318, and 320. As further shown in FIG. 3, computer controlled tape library 330 includes tape drives 334a, 334b, 334c, and 334d for performing data backup under the control of backup optimization application 336 running in combination with backup software 332, or may be as part of backup software 332. Computer controlled tape library 330 is also shown to include processor 338 controlling the operation of computer controlled tape library 330 and execution of backup software 332 and backup optimization application 336. FIG. 3 also includes data streams 324a, 324b, 326, 328b, 328c, 328d, and 330, which will be more fully described later.

It is noted that although in the present embodiment, data storage is provided by SAN 310, using computer controlled tape library 330 including tape drives 334a, 334b, 334c, and 334d, that characterization is merely exemplary. More generally, for example, SAN 310 may correspond to any suitable data storage architecture providing data backup capability, as known in the art. In addition, in the more general case, computer controlled tape library 330 is merely representative of a computer controlled backup library used by the data storage architecture. Moreover, in other embodiments, tape drives 334a, 334b, 334c, and 334d may correspond to any recording devices suitable to transfer the data backup to appropriate storage media, which may take the form of magnetic tape, as represented in FIG. 3, hard disc, optical media, or any other media having a suitable capacity/cost ratio for the specific storage implementation, for example.

Backup software 332, used by computer controlled tape library 330 to assist in controlling backup of data folders 314, 316, 318, and 320 using tape drives 334a, 334b, 334c, and 334d, may be any backup software compatible with computer controlled tape library 330 and SAN 310. Although in the embodiment of FIG. 3, backup software 332 is shown as distinct from but functioning in combination with backup optimization application 336, in other embodiments, backup software 332 and backup optimization application 336 may be merged, either one of those elements being subsumed within the other. Whether running cooperatively with backup software 332, running as an embedded script within backup software 332 or running as a control application having backup software 332 subsumed within itself, backup optimization application 336 is configured to enable a user, such as an administrator of system 300, to tune and optimize data backup by setting one or more user specified optimization variables specific to the nature of the backup project being undertaken.

In one embodiment, for example, a user specified optimization parameter may comprise an upper limit on the length of any single data stream used by computer controlled tape library 330 to backup data to tape drives 334a, 334b, 334c, and 334d. Such an upper limit may be defined in terms of a maximum quantity of data to be delivered by any one data stream, or in terms of the maximum time duration of any one data stream, for instance. In another embodiment, a specified optimization parameter may comprise a lower limit on the length of any data stream, such as a minimum data quantity, or a minimum time duration of the streams, for example. In other embodiments, combinations specifying upper bounds and lower bounds for the length of the data streams may be user specified.

In performing a backup project, such as backup of data folders 314, 316, 318, and 320, in FIG. 3, backup optimization application 336 is run on computer controlled tape library 330 and optimizes data backup. Backup optimization application 336 is configured to determine a backup project size, for example the amount of data contained in data folders 314, 316, 318, and 320, detect available tape drives 334a, 334b, 334c, and 334d, receive an input from a user such as a system administrator setting at least one user specified optimization variable, and utilize the user specified optimization variable to calculate a plurality of data streams for performing the data backup. Backup optimization application 336 is configured to then assign subsets of the plurality of data streams to tape drives 334a, 334d, 334c, and 334d to balance the timing efficiency and storage efficiency of the backup project and thus optimize data backup.

In the present embodiment, backup optimization application 336 is shown to reside within computer controlled tape library 330. In another embodiment, however, backup optimization application 336 may be stored on a computer-readable medium compatible with computer controlled tape library 330. For example, instructions comprising backup optimization application 336 which, when executed by computer controlled tape library 330, perform a method optimizing data backup may reside on the computer-readable medium. The method performed in response to the computer-readable medium stored instructions may include determining the backup project size, detecting available tape drives, receiving one or more user specified optimization variables, utilizing the user specified optimization variables to calculate a plurality of data streams for performing the data backup, and assigning subsets of the plurality of data streams to the available tape drives to optimize the data backup. In one embodiment, in addition, the method may include confirming that the one or more user specified optimization variables are within predetermined allowable ranges, such as acceptable maximum and minimum data stream lengths, for example.

The expression "computer-readable medium," as used in the present application, refers to any medium that provides instructions to computer controlled tape library 330. Thus, a computer-readable medium may correspond to various types of media, such as volatile media, non-volatile media, and transmission media, for example. Volatile media may include dynamic memory, such as dynamic random access memory (dynamic RAM), while non-volatile memory may include optical, magnetic, or electrostatic storage devices. Transmission media may include coaxial cable, copper wire, or fiber optics, for example, or may take the form of acoustic or electromagnetic waves, such as those generated through radio frequency (RF) and infrared (IR) communications. Common forms of computer-readable media include, for example, a compact disc read-only memory (CD-ROM), digital video disc (DVD), or other optical disc; a RAM, programmable read-only memory (PROM), erasable PROM (EPROM), FLASH memory, or a transmission carrier wave.

Figure 4:
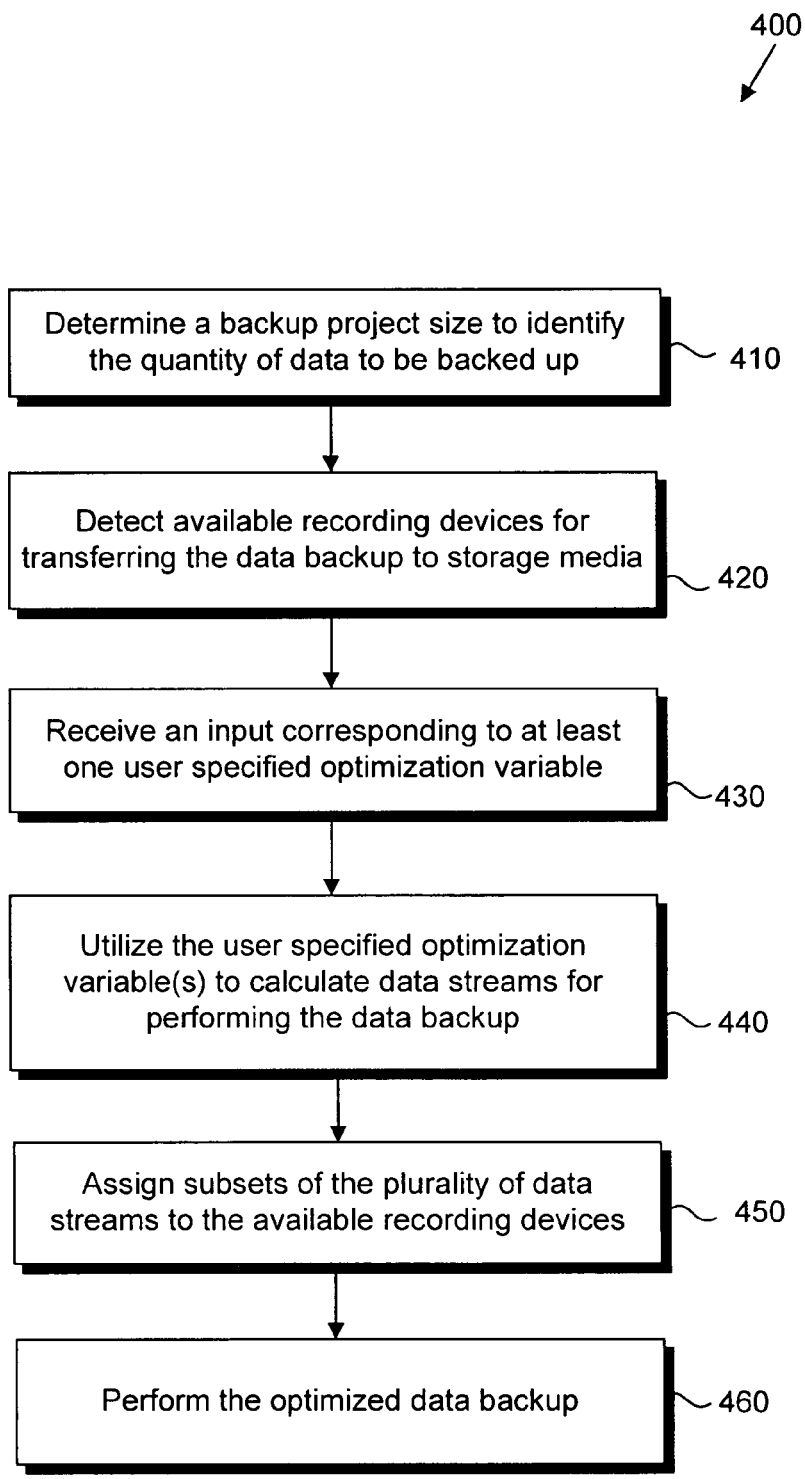
FIG. 4 is a flowchart presenting a method for optimizing data backup, according to one embodiment of the present invention.

The operation of system 300 will be further described in combination with FIG. 4, which presents a method for optimizing data backup, according to one embodiment of the present invention. Certain details and features have been left out of flowchart 400 that are apparent to a person of ordinary skill in the art. For example, a step may consist of one or more substeps or may involve specialized equipment or materials, as known in the art. While steps 410 through 460 indicated in flowchart 400 are sufficient to describe one embodiment of the present method, other embodiments may utilize steps different from those shown in flowchart 400, or may include more, or fewer steps.

Beginning with step 410 in FIG. 4 and system 300 in FIG. 3, step 410 of flowchart 400 comprises determining a backup project size, where the backup project size identifies the quantity of data to be backed up. Step 410 corresponds to determining the quantity of data held in data folders 314, 316, 318, and 320, by backup optimization application 336, in FIG. 3, for example. As shown in FIG. 3, the backup project size for that embodiment corresponds to the sum of three terabytes, two hundred gigabytes, four terabytes, and four hundred gigabytes, of data, held respectively in data folders 314, 316, 318, and 320. Backup optimization application 336, which can comprise an embedded script running within backup software 332, or as a stand alone control application including backup software 332, is configured to perform step 410 of flowchart 400.

The exemplary method of flowchart 400 continues with step 420, which comprises detecting available recording devices for transferring the data backup to storage media. As previously described in reference to FIG. 3, in the embodiment shown by system 300, step 420 corresponds to detection of available tape drives 334a, 334b, 334c, and 334d, by backup optimization application 336.

Flowchart 400 continues with step 430, comprising receiving an input corresponding to at least one user specified optimization variable. As previously explained, a user specified optimization parameter may comprise an upper limit on the length of any single data stream used to backup data. For example, that upper limit may in some circumstances be defined in terms of a maximum quantity of data to be delivered by any one data stream, or, alternatively, in terms of the maximum time duration of any one data stream. A user specified optimization parameter may also comprise a lower limit on the length of any data stream, such as a minimum data quantity, or a minimum time duration of the stream, for example. In some embodiments, combinations specifying upper bounds and lower bounds for the length of data streams may be user specified.

For example, a system administrator performing data backup using system 300, in FIG. 3, may determine that data and system parameters are such that specifying a minimum data quantity variable as seventy-five gigabytes of data per data stream, and a maximum data quantity variable as one hundred gigabytes of data per data stream optimizes the backup process. To take a somewhat different example, the storage media utilized by tape drives 334a, 334b, 334c, and 334d may have a maximum capacity of four hundred gigabytes, for example, and the system administrator may desire to preserve a storage buffer for footer data of twenty gigabytes on each storage tape, for example. Under those circumstances, the system administrator may set three-hundred fifty gigabytes as an upper bound for data stream size, and one hundred gigabytes as a lower bound. Those user specified optimization variables may then be provided as inputs to computer controlled tape library 330 and be received by backup optimization application 336, in step 430.

Permitting user specification of one or more optimization variables enables a user with special knowledge of the particular nature of the data to be backed up, and the performance profile of the system used to perform the backup, such as a system administrator, to optimize the backup process. Consequently, the spectrum of possible user specified optimization variables is as broad and varied as the data management environments from which they may arise. Thus, in some embodiments, user specified optimization variables may establish backup parameters other than maximum or minimum values for data stream length.

Although not included as a step in the method shown by flowchart 400, in one or more alternative embodiments, the present method may further comprise confirming that the one or more user specified optimization variables are within a predetermined allowable range. One such embodiment may correspond, for example, to a situation in which the allowable range or ranges are set be a system administrator, and the user specifying the one or more optimization variables is an information technology (IT) functionary with limited administrator privileges. In those embodiments, the confirming step may be performed by backup optimization application 336, for example.

Moving on to step 440 of flowchart 400, step 440 comprises utilizing the at least one user specified optimization variable to calculate a plurality of data streams for performing the data backup. Step 440 may be performed by backup optimization application 336 in combination with backup software 332. Then, in step 450, subsets of the plurality of data streams calculated in step 440 are assigned to available recording devices.

Referring once again to FIG. 3, steps 440 and 450 result in data streams 324a and 324b, formed from data held in data folder 314, being assigned to respective tape drives 334a and 334b, effectively distributing the data backup of data folder 314 to those two tape drives. Also as a result of steps 440 and 450, data stream 326 assigns the entirety of the backup job for data folder 316 to tape drive 334b. Similarly, data stream 330 assigns all of the backup for data folder 320 to tape drive 334d, while data streams 328b, 328c, and 328d distribute the backup job for data folder 318 across respective tape drives 334b, 334c, and 334d.

Steps 410 through 450 optimize the data backup, which may then be performed in step 460. Comparison of FIG. 3 with the conventional systems shown in FIGS. 1 and 2 reveals some of the advantages disclosed in the present application. For example, steps 410 through 450 of flowchart 400 result in assignment of data streams to available tape drives 334a, 334b, 334c, and 334d, in an arrangement that keeps all of those devices in substantially continuous use during data backup. That is to be contrasted with the conventional system of FIG. 1 in which only tape drive 134c is used throughout the backup, while tape drive 134a is idle some of the time, and tape drives 134b and 134d are idle most of the time. Consequently, a data backup project comparable to one lasting forty hours when performed by system 100, in FIG. 1, may be completed in approximately half the time when performed by the embodiment of the present invention shown in FIG. 3, for example. Thus, the presently described embodiments provide a substantial improvement in the timing efficiency of data backup when compared to the conventional approach represented by FIG. 1.

Figure 2:
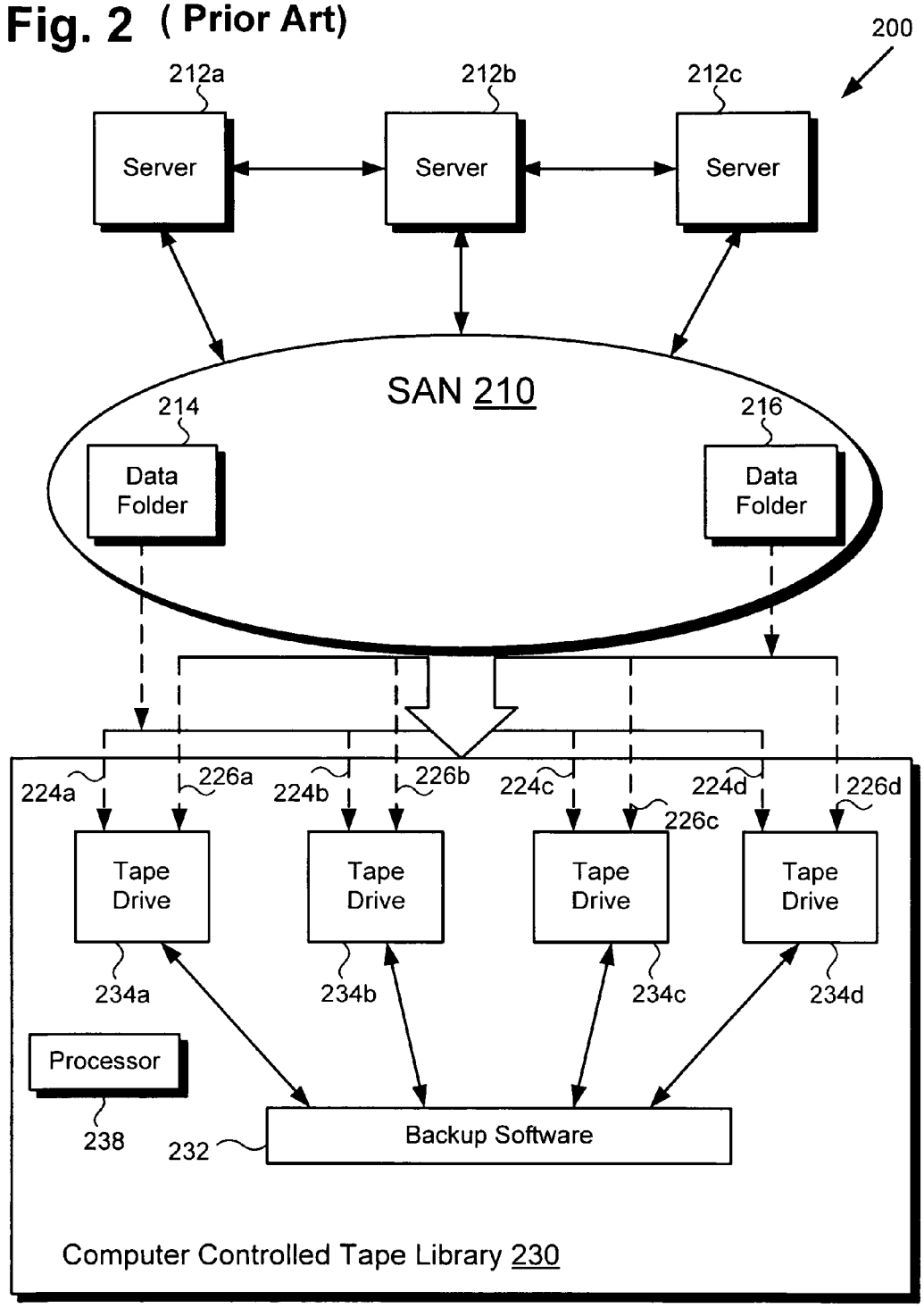
FIG. 2 shows a diagram of another conventional system for performing data backup in a SAN environment.

Comparing FIG. 3 with FIG. 2, it may be seen that the present application discloses an approach that allows data streams corresponding to data backup for a single data folder to be assigned to more than one tape drive, but minimizes both fragmentation and dispersion of the backup data. For example, data folders 316 and 320 are each locked to individual tape drives, while backup of larger data folder 314 is distributed across only two tape drives, and data streams from data folder 318, because of the enormity of that folder, are distributed over three tape drives. Consequently, compared to the system of FIG. 2, the exemplary embodiment shown by FIG. 3 may result in a data backup using fewer units of storage media, more fully utilizing each unit used, and more closely grouping related backup data, all of which make data restoration quicker and easier. Thus, the described embodiments of the present invention also provide a substantial improvement in the storage efficiency of data backup when compared to the conventional approach represented by FIG. 2.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for optimizing a data backup, the method comprising:
    determining a backup project size, the backup project size identifying the quantity of data to be backed up;
    detecting available recording devices for transferring the data backup to storage media;
    receiving an input corresponding to at least one user specified optimization variable;
    utilizing the at least one user specified optimization variable to calculate a plurality of data streams for performing the data backup, wherein the at least one user specified optimization variable comprises an upper limit on the length of each of the calculated plurality of data streams; and
    assigning subsets of the plurality of data streams to the available recording devices to optimize the data backup.

2. The method of claim 1, further comprising confirming that the at least one user specified optimization variable is within a predetermined allowable range.

3. The method of claim 1, wherein the data backup is implemented for a storage area network (SAN).

4. The method of claim 1, wherein the at least one user specified optimization variable limits the maximum time duration of each of the calculated plurality of data streams.

5. The method of claim 1, wherein the at least one user specified optimization variable comprises a lower limit on the length of each of the calculated plurality of data streams.

6. The method of claim 5, wherein the at least one user specified optimization variable sets the minimum quantity of data contained by each of the calculated plurality of data streams.

7. The method of claim 5, wherein the available recording devices are tape drives.

8. A system for optimizing a data backup, the system comprising:
    a processor;
    a plurality of recording devices; and
    a backup optimization application configured to run on the processor, the backup optimization application configured to:
        determine a backup project size;
        detect available recording devices from the plurality of recording devices;
        receive an input corresponding to at least one user specified optimization variable;
        utilize the at least one user specified optimization variable to calculate a plurality of data streams for performing the data backup, wherein the at least one user specified optimization variable comprises an upper limit on the length of each of the calculated plurality of data streams; and assign subsets of the plurality of data streams to the available recording devices to optimize the data backup.

9. The system of claim 8, the data backup is implemented for a storage area network (SAN).

10. The system of claim 8, wherein the at least one user specified optimization variable utilized by the backup optimization application limits the maximum time duration of each of the calculated plurality of data streams.

11. The system of claim 8, wherein the at least one user specified optimization variable utilized by the backup optimization application comprises a lower limit on the length of each of the calculated plurality of data streams.

12. The system of claim 11, wherein the at least one user specified optimization variable utilized by the backup optimization application sets the minimum quantity of data contained by each of the calculated plurality of data streams.

13. The system of claim 8, wherein the available recording devices are tape drives.

14. A computer-readable medium having stored thereon instructions comprising a backup optimization application which, when executed by a computer controlled backup library, perform a method for optimizing data backup, the computer-readable medium comprising:

code for determining a backup project size, the backup project size identifying the quantity of data in a data backup;

code for detecting available recording devices for transferring the data backup to storage media;

code for receiving an input corresponding to at least one user specified optimization variable;

code for utilizing the at least one user specified optimization variable to calculate a plurality of data streams for performing the data backup, wherein the at least one user specified optimization variable comprises an upper limit on the length of each of the calculated plurality of data streams; and code for assigning subsets of the plurality of data streams to the available recording devices to optimize the data backup.

15. The computer-readable medium of claim 14, wherein the computer controlled backup library is implemented for a storage area network (SAN).

16. The computer-readable medium of claim 14, wherein the at least one user specified optimization variable limits the maximum time duration of each of the calculated plurality of data streams.

17. The computer-readable medium of claim 14, wherein the at least one user specified optimization variable comprises a lower limit on the length of each of the calculated plurality of data streams.

18. The computer-readable medium of claim 17, wherein the at least one user specified optimization variable sets the minimum quantity of data contained by each of the calculated plurality of data streams.

19. The computer-readable medium of claim 14, wherein the available recording devices are tape drives.

\* \* \* \* \*